April 4, 1950  J. F. MAINE  2,502,467

CORE MOLDING MACHINE

Filed Jan. 4, 1946  5 Sheets-Sheet 1

INVENTOR.
James F. Maine
BY Harry R. Canfield
ATTORNEY

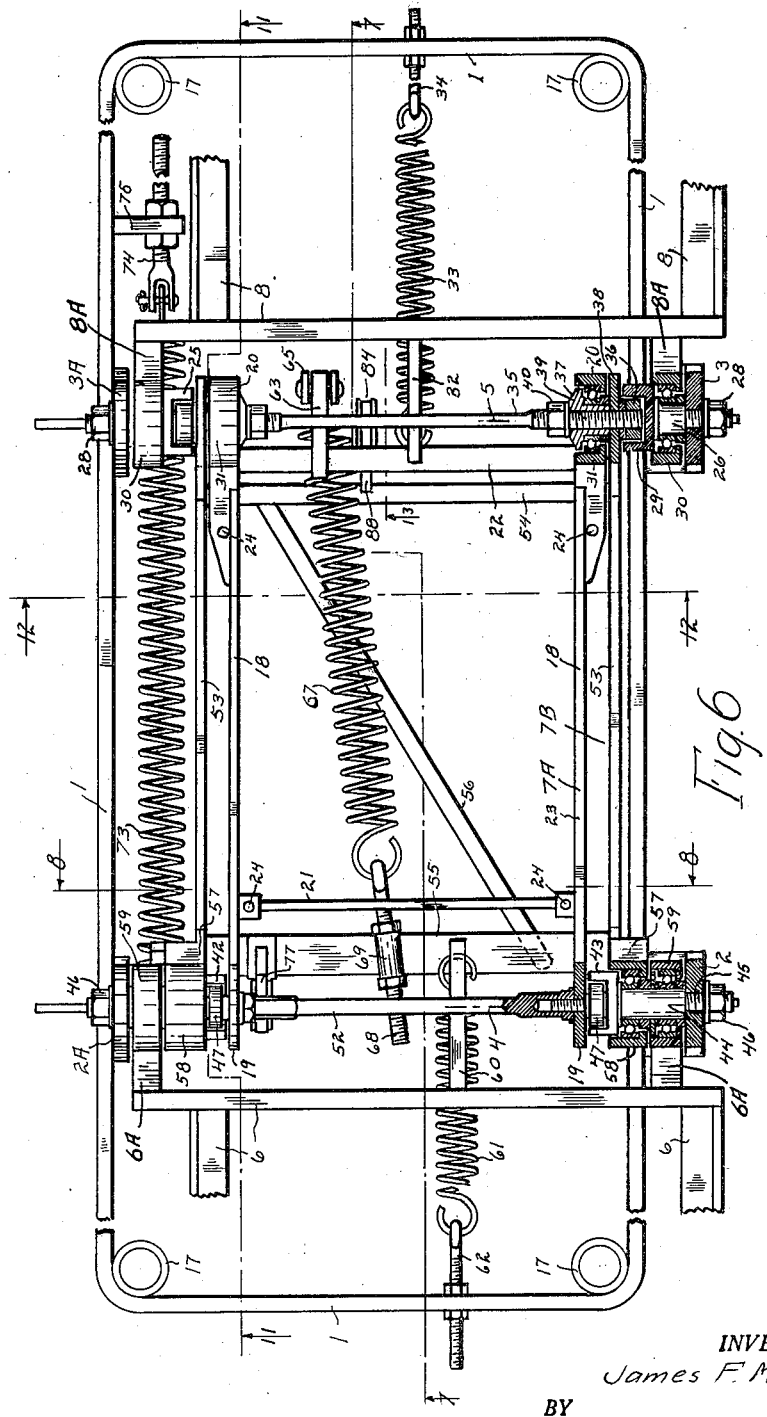

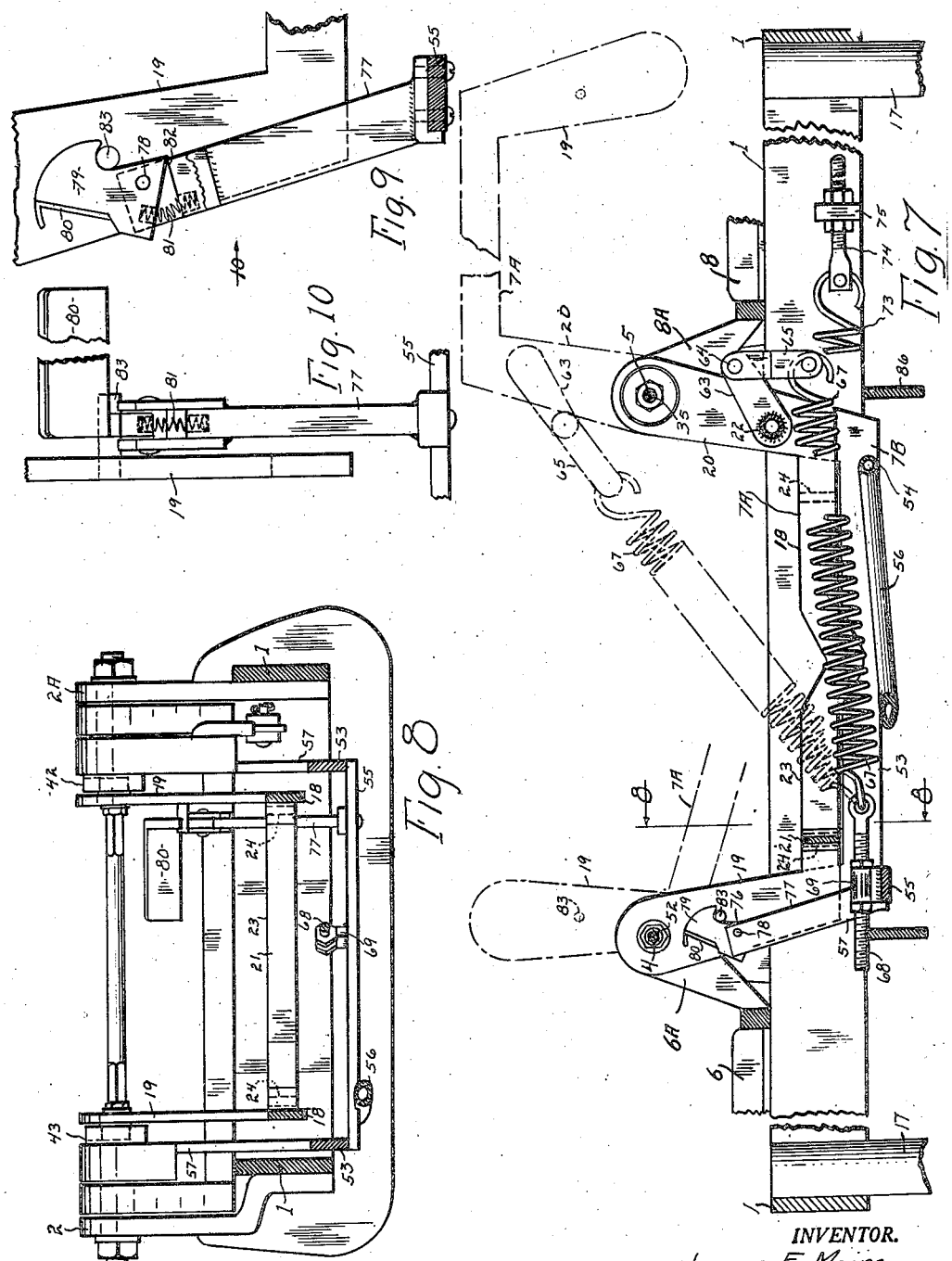

April 4, 1950
J. F. MAINE
2,502,467
CORE MOLDING MACHINE
Filed Jan. 4, 1946
5 Sheets-Sheet 4
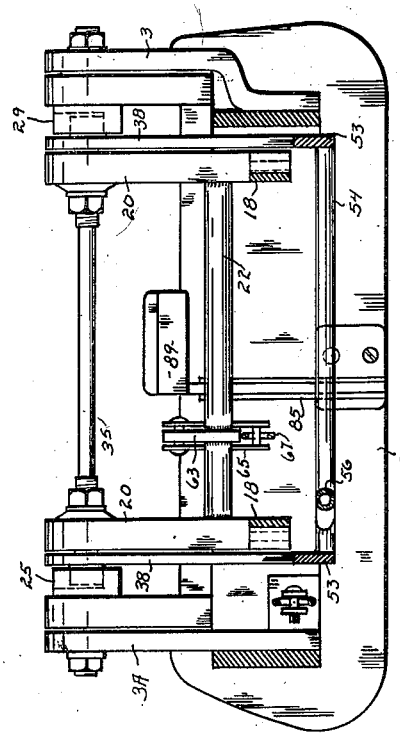
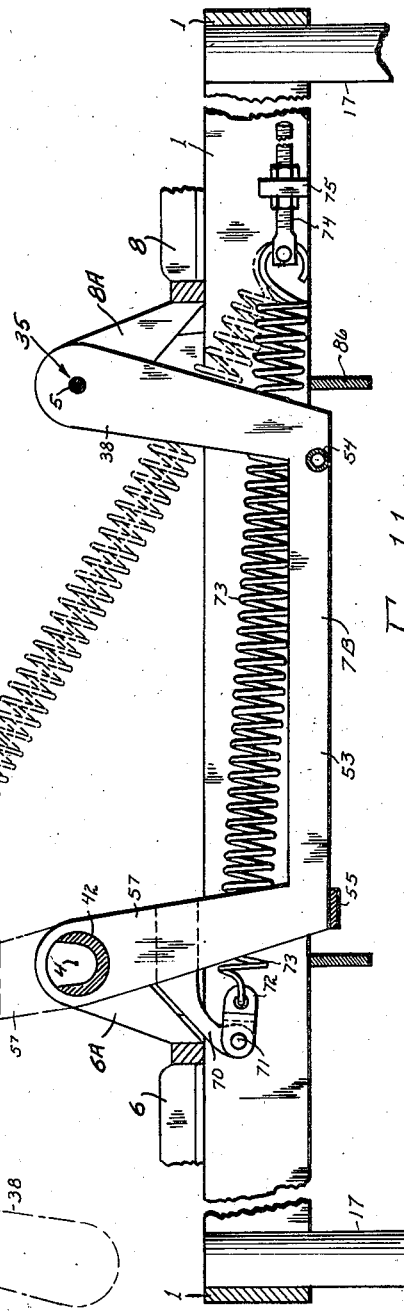
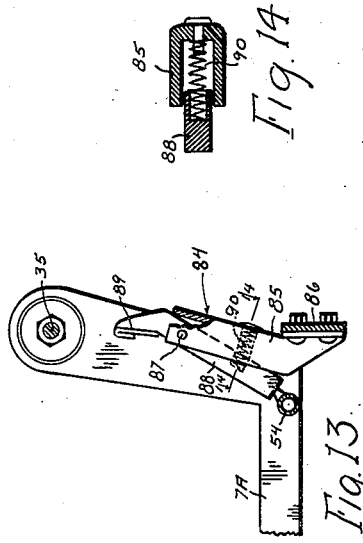
INVENTOR.
James F. Maine
BY Harry R. Canfield
ATTORNEY April 4, 1950   J. F. MAINE   2,502,467
CORE MOLDING MACHINE
Filed Jan. 4, 1946   5 Sheets-Sheet 5
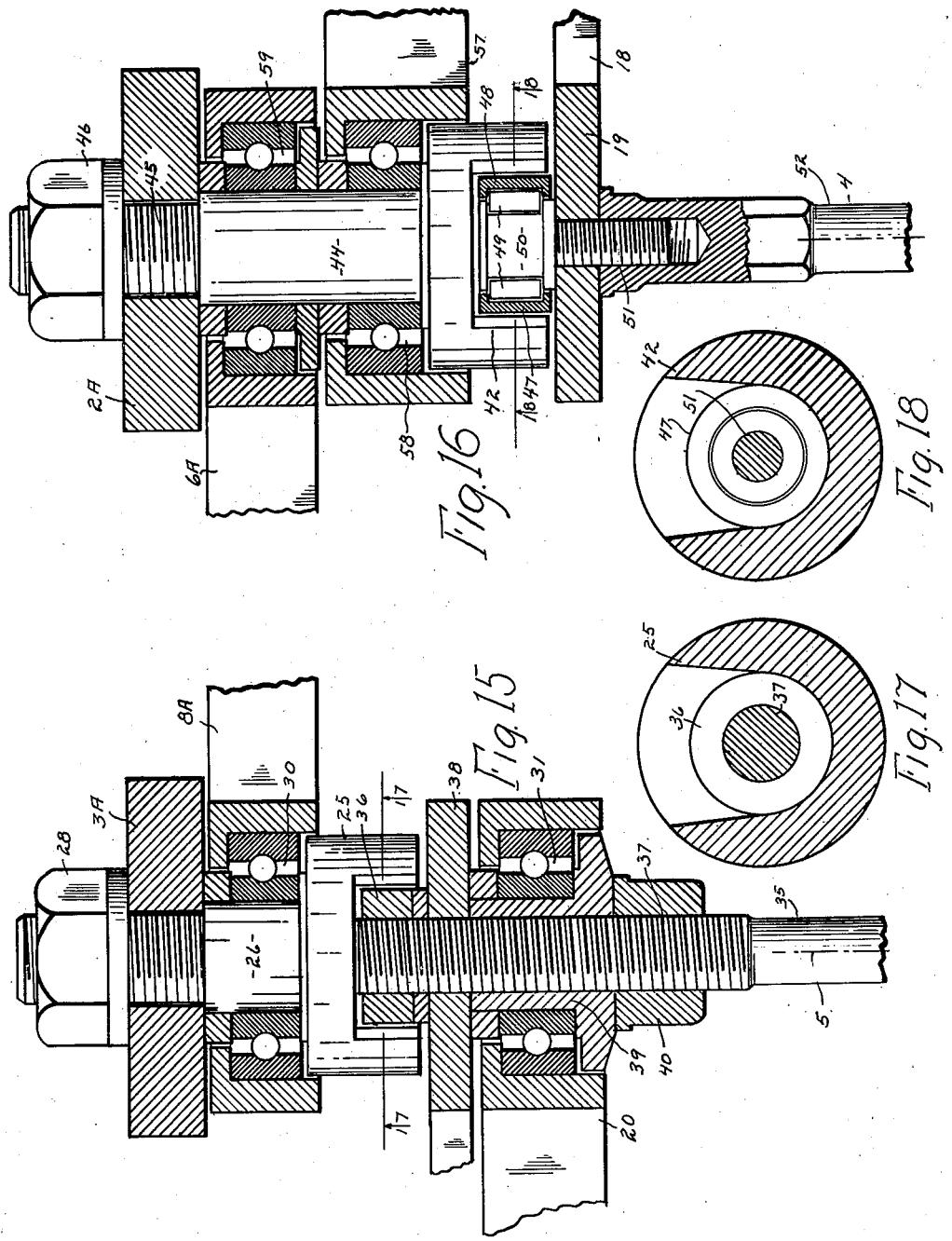
INVENTOR
James F. Maine
By Harry P. Canfield
ATTORNEY Patented Apr. 4, 1950

2,502,467

UNITED STATES PATENT OFFICE 2,502,467

CORE MOLDING MACHINE

James F. Maine, Cleveland, Ohio, assignor to The Consolidated Iron-Steel Mfg. Co., Cleveland, Ohio, a corporation of Ohio Application January 4, 1946, Serial No. 639,077

6 Claims. (Cl. 22—10)

This invention relates to molding apparatus and particularly to apparatus for making foundry mold cores.

Core making machines are known by which a pair of mating core molds are filled with sand-like core making material, each mold providing a part of the core and having a planar parting surface; and in which the molds are moved with a booking movement to superimpose the two parts one upon the other; and in which by a further booking movement, the complete but fragile core thus formed is transferred to a drier device or support which fits the core by which it may be supported without damage and on which it may be carried to a drying or backing oven, where it is rendered rigid and durable and ready for use in a foundry molding flask.

One such core molding machine constitutes the subject matter of Patent No. 2,196,835, April 9, 1940; and the present invention may be considered as comprising improvements over the machine of that patent; and reference to said patent will afford a better background for consideration of the present invention.

As shown in that patent, for example, and as contemplated in the present invention, a core molding machine of this class comprises at least three hingingly supported frame elements, disposed in a line; two of them for supporting molds for the core parts, and which for convenience may be designated as the left hand and middle frame elements, and the other or right hand frame element supporting the drier device or support for the whole core. The molds and drier device have open cavities for their described purposes, and the frame elements normally occupy horizontal positions to dispose the said cavities upwardly open.

In operating such a machine, as described in said patent, after the core mold cavities are filled with core material, the left hand and middle elements are hingingly rocked by hand around a common axis, one clockwise and the other counterclockwise, to vertical positions, to bring the two core parts therein together; and then both are rocked clockwise to horizontal positions and to deposit the complete core in the mold cavity of the middle frame element, and the other or left hand frame element is rocked back again, counterclockwise to its original position. The middle frame element now carries the complete core in its mold cavity. The core drier device is then placed on the core. The right hand frame element is then rocked by hand around a second common axis, to hold the drier device upon the core, and then both the middle frame element and right hand frame element are rocked together clockwise to deposit the drier device, and the contained core, on the now horizontal right hand frame element, and the middle frame element is then rocked counterclockwise back to its original horizontal position. The drier device with the core in its cavity is then removed to the oven.

The left hand and right hand frame elements thus each rock about an axis of rotation, and the middle frame element rocks alternately around both of these axes.

A particular construction of bearings is thus required to provide this rotational or rocking movement of the elements about the said axes, and it is one of the objects of this invention to provide improved bearing constructions and bearing supports for these purposes.

The said frame elements must be made of metal to be strong, durable and accurately positionable, and must be of ample size to accommodate large cores, and therefore are unavoidably of such size and weight, including the weight of the molds and drier device, so that the rocking of the frame elements is fatiguing to the operator, particularly when operated by women.

It is a known expedient to counterbalance the weight of a rocking element of a machine of this general class, as evidenced by the utilization of a counterbalancing spring in the aforesaid patent, for one of the parts thereof not involved in the said booking movements of the core making frames. But so far as I am aware it has heretofore been considered impossible to counterbalance the said rocking frame elements of a core molding machine, having the complex booking movements described above, and particularly the middle frame element, because of the fact that it rocks about two axes alternately.

It is therefore another object of the invention to provide a core molding machine of the type referred to in which all of the booking or rocking elements are weight-counterbalanced.

Another object is to provide a core molding machine of the type described above provided with weight counterbalancing means for the booking frame element thereof which rocks around either of two said axes alternately.

Another object is to provide improved latching means coordinated with the aforesaid counterbalancing means of the said hingingly supported booking elements.

Other objects will be apparent to those skilled in the art to which the invention appertains.

The invention is fully disclosed in the following description taken in connection with the accompanying drawing, in which:

Figs. 1 to 5 inclusive are diagrammatic views illustrating the successive steps of the method of making a core by the actual apparatus illustrated in the other figures;

Fig. 6 is a top plan view of an apparatus embodying the invention, with parts broken away for simplification, and parts in section;

Fig. 7 is a sectional view from the plane 7 of Fig. 6, with parts behind the section plane omitted to simplify the drawing;

Fig. 8 is a sectional view from the plane 8 of Fig. 6 or Fig. 7;

Fig. 9 is a view to enlarged scale of a latch mechanism of Fig. 7;

Fig. 10 is a view in the direction of the arrow 10 of Fig. 9;

Fig. 11 is a view from the plane 11 of Fig. 6;

Fig. 12 is a sectional view from the plane 12 of Fig. 6;

Fig. 13 is a view to enlarged scale of a latch mechanism the view being taken from the plane 13 of Fig. 6;

Fig. 14 is a sectional view to enlarged scale from the plane 14 of Fig. 13;

Figs. 15 and 16 are sectional views to enlarged scale of parts shown in plan in Fig. 6;

Fig. 17 is a sectional view from the plane 17 of Fig. 15;

Fig. 18 is a sectional view from the plane 18 of Fig. 16.

Figure 1:
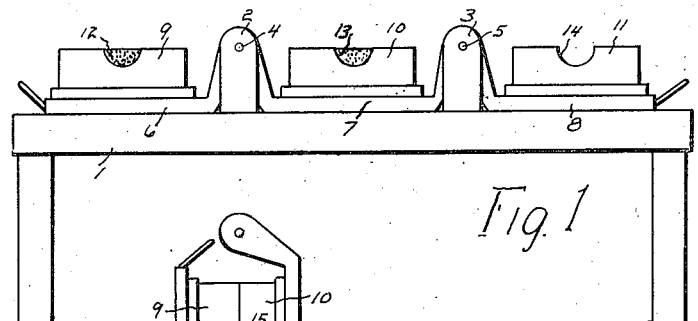

In Figs. 1 to 5 inclusive is illustrated diagrammatically the above described booking movements of a machine of the class referred to.

A main frame 1 has upright posts 2 and 3 thereon providing supports for bearings, the axes of which are indicated at 4 and 5, respectively.

A left hand end frame 6, a middle frame 7, and a right hand end frame 8 normally rest on the frame 1, and may be rocked by hand with hinging or booking movements on the said axes 4 and 5.

At 9 and 10 are two halves of a core mold mounted on the frames 6 and 7 respectively, and at 11 is a carrier or drier device for the finished core on the frame 8.

Figure 2:
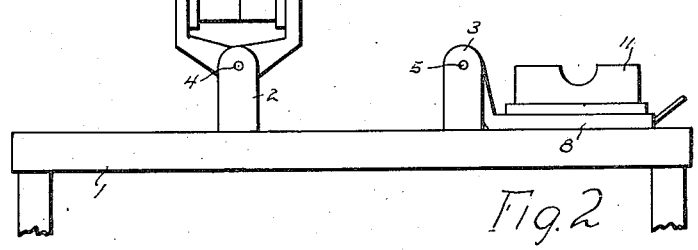

In operation the two halves of the core mold, 9 and 10, are secured to their frames 6 and 7, and have their mold cavities 12 and 13 filled with core making material struck off on a parting line or plane, and then the frames 6 and 7 are both rocked by hand toward each other around the axis 4 into the position of Fig. 2 superimposing the two core molds 9 and 10 upon each other on the parting plane, and forming the complete core 15 therebetween.

Figure 3:
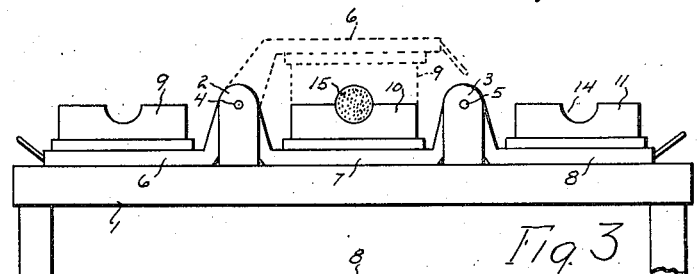

The two frames 6 and 7 are then rocked clockwise to the position of Fig. 3 wherein the frame 6 and core mold 9 are shown in broken line and the frame 7 and core mold 10 in solid line; and the frame 6 and core mold 9 are then rocked back to their original position shown in solid line, removing the core mold 9 from the core 15 leaving it in the core mold 10.

Figure 4:
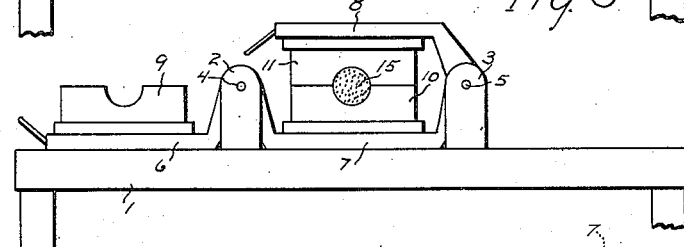

The core carrier 11 is then picked up and laid on the core mold 10 as shown in Fig. 4, and the frame 8 is rocked counterclockwise around its axis 5 to the position of Fig. 4.

Figure 5:
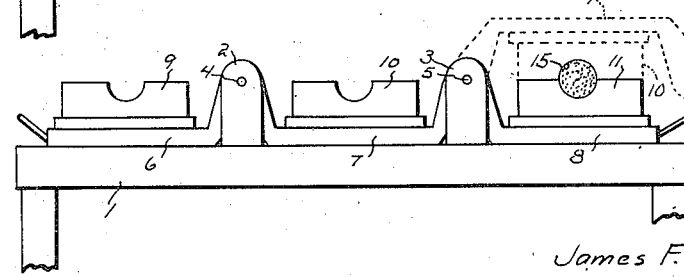

Both frames 7 and 8 are then rocked clockwise around the axis 5 to the position of Fig. 5 wherein the frame 7 and the core mold 10 are shown in broken line, and then the frame 7 and the core mold 10 are rocked counterclockwise around the axis 5 to the position shown in solid line in Fig. 5 leaving the finished core 15 on the carrier or drier device 11.

The carrier 11 with the finished core therein is then removed to the baking oven.

In view of the state of this art including the aforesaid patent, it is believed that it will be understood how the halves of the core mold, 9 and 10, and the drier device or support 11 are constructed, and how the molds are positioned on their respective frames 6 and 7 and secured thereto, by bolts or the like, and that further description thereof herein is unnecessary; and inasmuch as the present invention relates to the construction and operation of the frames, particularly the middle frame 7 and its bearings on the axes 4 and 5, and the means for counterbalancing the weight of the frames, particularly the weight of the middle frame 7 in both directions of oscillation on these axes, the following description will be confined largely to those features to avoid complications, and this will not be given in connection with Figs. 6 to 18 inclusive.

The main frame 1 comprises a vertically edgewise strip of metal bent into rectangular form, see Figs. 6, 7, and 11, and supported at its corners by tubular legs 17—17, and has the aforesaid bearing posts 2 and 3 on the front side thereof and corresponding opposite bearing posts 2A and 3A at the rear side; the posts 2 and 2A providing supports for front and rear bearing constructions respectively having in general a bearing axis 4 and the front and rear posts 3 and 3A likewise providing supports for front and rear bearing constructions having in general the bearing axis 5, these axes being indicated in Figs. 7 and 11.

The middle frame 7 is, in the actual structure, in two frame parts 7A and 7B.

The part 7A comprises forwardly and rearwardly spaced side rails 18—18, at the left end of which are hanger arms 19—19 extending upwardly therefrom toward the bearing axis 4 and at the right end of which are similar hanger arms 20—20 extending upwardly to the bearing axis 5. The side rails 18—18 are connected together and braced near their left hand ends by a transverse bar 21 and near their right hand ends by a transverse tubular brace 22, which braces may be welded at their opposite ends to the side rails.

The upper sides of the side rails 18—18 provide a surface 23 upon which the core mold 10 of Fig. 1 may be mounted, and by means of four bolt holes 24—24 the core mold may be fastened thereon by bolts not shown.

Each of the hanger arms 20—20 is provided with a ball bearing construction 31 for oscillation about the axis 5, one of the bearing constructions being shown to small scale in section on the front of the device in Fig. 6 and the one on the rear of the device being shown to larger scale in section in Fig. 15.

An upwardly open socket 25 has a shank 26 thereon, and a reduced diameter threaded portion thereof extending through the post 3A and rigidly mounted thereon by a nut 28 as shown in Fig. 15; and a similar socket 29 is mounted on the post 3.

The right hand end frame 8 (Fig. 1) shown fragmentarily at 8—8, Figs. 6 and 15, is provided with ball bearing constructions 30 in hanger arms 8A mounted on the shanks 26—26 of the two sockets 25 and 29 for oscillating on the axis 5; and with a depending finger 32, Fig. 6, on the frame 8; and with a spring 33 hooked at one end into the lower end of the finger 32 and at the other end hooked into an adjustable stud 34 on the main frame 1; thereby providing means for counterbalancing the weight of the frame 8.

A round rod 35 (which as will appear later functions as a handle bar has on its opposite ends, trunnions 36—36 normally resting in and bottoming in the sockets 25 and 29, and rigidly mounted on the ends of the rod 35; and to this end, the ends of the rod 35 are threaded as at 37, and the trunnions 36 are threaded as nuts and screwed thereon, and the threaded portions 37 of the rod extend through bores in an upwardly extending hanger arm 38 of the frame portion 7B to be referred to, and through a bearing core 39, and a clamping nut 40 is provided on the threads 37; whereby a rigid assembly is made constituting the rod 35, trunnion nut 36, hanger arm 38, and bearing core 39; and whereby the rod 35 is normally supported by the trunnion nuts 36 in the sockets 25 and 29. Ball bearing constructions shown generally at 31—31 are assembled on and with the bearing cores 39 and upon these ball bearings, the hanger arms 20—20 have oscillatory bearing around the axis 5 of the rod 35; and as indicating this oscillatory movement, the frame 7A is shown in Fig. 7 in its normal position in solid line, and in broken line is shown in its fully oscillated position referred to in connection with Figs. 1 to 5, and in a partly oscillated position in the left hand of the figure by the fragmentary showing in broken line of the hanger arm 19 and frame 7A.

At the left hand side of the device are upwardly open sockets 42 and 43 mounted respectively on the posts 2A and 2 by shanks 44 thereon having threaded portions 45 extending through bores in the posts and nuts 46 on the threads.

The hanger arms 19, rising from the left end of the frame 7A and from the side rails 18—18 thereof, have mounted thereon roller bearing trunnions 47, normally in and bottomed in the sockets 42 and 43. To this end, the roller bearing trunnion comprises an outer tubular cylindrical shell 48, the inside of which constitutes a raceway for rollers 49, and has an inner raceway 50 for the rollers provided with a threaded stud 51 extending through the hanger arm 19 and threaded into the end of a rod 52, whereby the hanger arm 19 is clamped between the raceway 50 and the end of the rod 52, to mount both the roller bearing trunnions 47 and the rod 52 upon the hanger arms 19—19; the rod 52 functioning in the operation of the device as a handle bar to be referred to.

From this much of the description it will be clear that the frame part 7A which is the part supporting the core mold 10 of Fig. 1, is normally supported at its right end on the ball bearing constructions 31—31, and at its left end is supported by the roller bearing trunnions 47, and that upon grasping the rod 52 as a handle the frame part 7A may be rotated clockwise around the axis 5 on the ball bearings 31—31, lifting the trunnions 47 out of the sockets 42 and 43.

The other of the two parts of the middle frame, namely the part 7B, comprises spaced apart side rails 53—53 connected together and braced by a tubular brace 54 at the right hand side, and by a flat bar 55 at the left hand side, and by a diagonal brace 56 welded at opposite ends to the brace 54 and the bar 55. Hanger arms 57 extend upwardly from the left end of the side rails 53, and the aforesaid hanger arms 38 extend upwardly from the right hand end thereof. The side rails 53—53 of the frame part 7B as shown in Fig. 7 are at a lower level than the side rails 18—18 of the frame part 7A. The hanger arms 38 as described above are rigidly clamped upon the transverse handle bar 35 and likewise have the nut trunnions 36 thereon as described. The hanger arms 57 at the left end of the frame part 7B are provided with ball bearing constructions 58 mounted upon the shanks 44 which support the sockets 42 and 43.

The left hand end frame 6 referred to in connection with Figs. 1 to 5 and fragmentarily shown at 6—6—6 in Figs. 6, 7, and 11, is also mounted on the said socket shanks 44 by ball bearing constructions 59—59, in hanger arms 6A of frame 6, and has a finger 60 depending therefrom, and a spring 61 hooked at one end into the lower end of the finger and at its other end hooked into an adjusting stud 62 on the main frame 1 by which the frame 6 is counterbalanced.

From this much of the description as to the frame part 7B it is believed to be evident that upon grasping the rod 35 as a handle bar and lifting on it, both frames 7A and 7B will be rocked counterclockwise around the axis 4, the rod 35 lifting the bearing constructions 31—31, and lifting the nut trunnions 36 out of the sockets 25 and 29, the frame 7B rotating on the axis 4 on the ball bearing construction 58—58, and the frame 7A at the same time rotating on the roller bearing trunnions 47—47; Fig. 11 showing in solid line the frame 7B in its normal position and in dotted line in its full counterclockwise rocked position.

It is here emphasized that both frame parts 7A and 7B rock together clockwise or counterclockwise around the axis 4; and that the frame part 7A alone rocks clockwise or counterclockwise around the axis 5, leaving the frame part 7B in its normal unrocked position.

The counterbalancing springs for the frame parts 7A and 7B will now be described.

For the frame part 7A, Figs. 6 and 7, the bracing bar or tube 22 has an arm 63 welded thereto under the axis 5 extending toward the right at an upward inclination. Pivoted to its end as at 64 is a depending link 65, free to rotate counterclockwise on the pivot 64 but prevented normally from rocking clockwise by the engagement of a shoulder on the link with the arm 63. A spring 67 is hooked at one end to the lower end of the link 65 and at its other end is hooked into an adjustment stud 68 extending through an eye 69 welded upon the brace bar 55, and with lock nuts on each side of the eye as shown to adjust the tension of the spring 67.

For the frame 7B, one of the hanger arms 57 has a finger 70 thereon pivoted at its lower end as at 71 and below the axis 4 to a link 72, and a spring 73 is hooked at one end into the link 72 and at its other end is hooked to a threaded adjusting stud 74 extending through a post 75 on the main frame and with lock nuts on each side of the post as shown to adjust the tension of the spring 73.

With the arrangement of the counterbalance springs 67 and 73 as disposed and as shown, and as above described, these springs with the frame parts in their normal positions illustrated, exert resilient torque tending to rotate the frame 7A clockwise and the frames 7A—7B counterclockwise around the axes 4 and 5 respectively; and inasmuch as in the operation of the device as described it is required that the said frame parts normally remain in their unrocked positions illustrated, and that the two frame parts 7A and 7B are to be rocked together at one time, and the frame part 7A is to be rocked alone at another time, means is provided to hold the frames against being rocked by their counterbalancing springs except when rocking is wanted, and operable by the operator of the device at the time of rocking the frames; and this means, comprising latches, which will now be described.

To normally latch the frame part 7A, a latch device shown generally at 76 in Figs. 6 and 7 is provided, the same being further illustrated in Figs. 9 and 10.

A post 77 is mounted upon and extends upwardly from the transverse bar brace 55 and at its upper end has pivoted thereto, on a pivot pin 78, a latch 79, provided with a horizontal handle 80. A spring 81 resiliently urges the latch 79 in the clockwise direction around the pivot pin 78 as viewed in Figs. 7 and 9, and toward a shoulder 82 on the post 77, whereby the movement of the latch may be limited and the spring 81 always loaded. A latch pin 83 is provided on the hanger arm 19.

The latch 79 normally hooks over the pin 83 and holds the frame parts 7A down in its normal position. To release the frame 7A so that it can be rocked around the axis 5, the operator, when he grasps the handle bar 52, may engage the latch handle 80 with his thumb or finger and rock the latch out of engagement with the latch pin 83. When the frame 7A is returned counterclockwise to its normal position, the latch pin 83 (see Fig. 7 where it is shown in a partly rocked position of the frame part 7A) descends and engages the latch 79 in its said limited position and cammingly rocks it counterclockwise around the pivot 78, and finally the latch 79 snaps clockwise over the pin 83 to latch the frame part 7A in its normal position.

To latch the two frames 7A—7B from rocking counterclockwise around the axis 4, a latch shown generally at 84 is provided. A channel-shaped post 85 is secured at its lower end to a transverse brace element 86 of the main frame, Figs. 11 and 13, and extends upwardly therefrom, and has a pivot pin 87 thereon. A latch 88 is mounted on the pin and between the side flanges of the channel 85, and above the pivot pin it has a handle 89. The latch 88 is constrained resiliently in the clockwise direction by a spring 90. The lower end of the latch element 88 abuts upon the transverse brace pipe 54 on the frame part 7A. The latch handle 89 is convenient to the hand of the operator grasping the handle bar 35, and upon rocking the latch 88 counterclockwise as viewed in Fig. 13 against the tension of the spring 90, the latch 88 is freed from the brace 54 and the frames 7A—7B are freed to rock about the axis 4. When these frames are returned to their normal position, the bar 54 rides over the lower end of the latch 88 and then the latter snaps back into the position of Fig. 13 and latches these frames down again in their normal position.

Referring again to Fig. 3, when the frame 6 and the core mold 9 were rotated back around the axis 4 from the broken line to the solid line position, it is presupposed that the core is of such shape that the core mold 9 will draw away therefrom without mutilating the core, although the core mold 9 moves on a circular arc around the axis 4. In some cases however the core 15 may be of such shape or of such great vertical dimension that to thus strip the core mold 9 from it on a circular arc would mutilate it. In such cases, I have provided means in which when the two core molds 9 and 10 are superimposed on each other as in Fig. 3, the core mold 10 may be withdrawn downwardly from the core mold 9 to draw the core out of the core mold 9 vertically before the core mold 9 is rotated counterclockwise around the axis 4.

It will be observed that the illustrated and described disposition of the said counterbalancing springs 67 and 73 and of their connections with their respective frames 7A and 7B, causes them to have the following counterbalancing characteristics. When the frames are in their normal positions and are ready to be rocked, by the operator grasping the handle bars, the weight to be lifted is maximum lying as it does entirely at one side of the axis 4 or 5, and in this position the counterbalancing torque exerted by the spring in each case tending to aid the rocking movement is the maximum. As the frames are rocked and the center of gravity of the frames becomes more and more nearly vertically above the axes 4 and 5, the counterbalancing torques of the springs, acting in the direction to help lift the frames, dies out. When the frames are rotated beyond the vertical position, the torques exerted by the springs begin to build up in the opposite direction and again become maximum when the frames have been rocked to approximately 180 degrees from the normal position. In other words, the frame 7A rocks through approximately 180 degrees around the axis 5 and the frames 7A—7B rock approximately 180 degrees around the axis 4. At the beginning and ending of this angular movement, the effective weight of the frame in each case is great and diminishes toward the middle of the movement. The counterbalancing springs counterbalance the weight approximately equally throughout the 180 degrees by exerting great counterbalancing torque at the beginning and ending of the angular movement, and the torque diminishing to practically zero at the middle of the movement.

To further summarize the description of the hinging movements of the frame parts 7A and 7B, and their latching and spring mechanisms and their mode of operation, it is here added that: the frame part 7A is normally latched to the frame part 7B at their left ends as viewed in Fig. 6; and the frame part 7B is normally latched at its right end to the stationary main frame. When the frame part 7B is unlatched from the main frame, the two frame parts are left latched together and both can then be given a hinging movement in unison on the axis 4, at their left ends, upwardly and over this axis in alternate directions. When the frame part 7B is latched to the main frame, the frame part 7A can be unlatched from it, the part 7B remaining latched to the main frame, and the part 7A can then be given a hinging movement by itself on the axis 5, at its right end, upwardly and over that axis in alternate directions.

As to the counterbalancing springs, the spring 67, connected at its right end to the frame part 7A to counterbalance its movement around the axis 5, is connected at its left end to the frame part 7B and is therefore stationary at that end when the frame part 7A is moving by itself. The spring 73 connected at its left end to the frame part 7B to counterbalance both frame parts 7B and 7A when moving around the axis 4, is connected at its right end to the stationary main frame 1. When the parts 7A—7B rock around the axis 4, in unison, the spring 67 moves bodily in unison with them. Thus each spring acts independently of the other to exert counterbalancing torque, and neither affects or modifies the action of the other, whereby each can be independently adjusted for the optimum amount of counterbalancing torque, for any given weight of either of the rocking parts, 7A or 7A—7B.

An illustrative embodiment of the invention has been set forth above, but the invention is not limited in all respects to this particular embodiment. Changes and modifications in various parts of the described structure may be made, such as will occur to those skilled in the art; and the invention is comprehensive of all such changes and modifications which come within the scope of the appended claims.

I claim:

1. In a core molding machine, a main frame, two bearing constructions on the main frame providing two bearing axes spaced apart; a core-mold-supporting frame in two frame parts; the bearing constructions comprising means hingingly supporting one frame part for hinging movement by itself on and upwardly over one bearing axis in alternate directions; and comprising means hingingly supporting both frame parts for hinging movement together in unison on and upwardly over the other bearing axis in alternate directions; the said one frame part constructed to have a core mold attached thereto; a pair of latch means to latch the respective frame parts each in a normal position to prevent said hinging movements thereof and selectively releasable by an operator to permit hinging movement of the one frame part by itself and hinging movement of both frame parts in unison; and respective weight counterbalancing means arranged to counterbalance the weight of the one frame part during hinging movement thereof by itself and to counterbalance the weight of both frame parts during hinging movement thereof in unison.

2. In a core molding machine, a main frame, two bearing constructions on the main frame providing two bearing axes spaced apart; a core-mold-supporting frame in two frame parts; the bearing constructions comprising means hingingly supporting one frame part for hinging movement by itself and independently of movement of the other part on and upwardly over one bearing axis in alternate directions, and comprising means hingingly supporting both frame parts for hinging movement together in unison on and upwardly over the other bearing axis in alternate directions; said one frame part having a trunnion thereon normally removably engageable in an upwardly open socket receptacle at the said other bearing axis; and the other of the frame parts having a trunnion thereon normally removably engageable in an upwardly open socket receptacle at the said one bearing axis.

3. In a core molding machine, a main frame; two bearing constructions on the main frame providing two bearing axes spaced apart; a core-mold-supporting frame in two frame parts; the bearing constructions comprising means hingingly supporting one frame part having hinging movement by itself on and upwardly over one bearing axis in alternate directions, and said part having a trunnion thereon normally removably engaging in an upwardly open socket receptacle at the other axis; and comprising means hingingly supporting both frame parts for hinging movement together in unison on and upwardly over the other bearing axis in alternate directions; and the other of the frame parts having a trunnion thereon normally removably engaging in an upwardly open socket receptacle at the said one bearing axis; a pair of latch means to latch the frame respective parts in normal positions with their respective trunnions in the respective sockets to prevent hinging movement thereof, and releasable selectively by an operator to permit hinging movement of the one frame part by itself and hinging movement of both frame parts in unison, selectively.

4. In a core molding machine, a main frame, two bearing constructions on the main frame providing two bearing axes spaced apart; a core-mold-supporting frame in two frame parts; the bearing constructions comprising means hingingly supporting one frame part for hinging movement by itself on and upwardly over one bearing axis in alternate directions; and comprising means hingingly supporting both frame parts for hinging movement together in unison on and upwardly over the other bearing axis in alternate directions; the said one frame part constructed to have a core mold attached thereto; a latch to normally latch the other of the frame parts to the main frame and a latch to normally latch the one frame part to the other frame part, to normally prevent hinging movements, and the latches being releasable by an operator selectively.

5. In a core molding machine, a main frame, two bearing constructions on the main frame providing two bearing axes spaced apart; a core-mold-supporting frame in two frame parts; the bearing constructions comprising means hingingly supporting one frame part for hinging movement by itself on and upwardly over one bearing axis in alternate directions; and comprising means supporting both frame parts for hinging movement together in unison on and upwardly over the other bearing axis in alternate directions; the said one frame part constructed to have a core mold attached thereto; weight counterbalancing means for the two frame parts when hingingly moving in unison comprising a spring connected between the other of the frame parts and the main frame; and weight counterbalancing for the one frame part when hingingly moving by itself comprising a spring connected between the two frame parts.

6. In a core molding machine, a main frame, two bearing constructions on the main frame providing two bearing axes spaced apart; a core-mold-supporting frame in two frame parts; one frame part provided with means for attaching a core mold thereto and having hinging movement by itself on and upwardly over one bearing axis in alternate directions, and normally supported by a trunnion thereon removably engaging in an upwardly open socket receptacle at the other axis; and both frame parts having hinging movement together in unison on and upwardly over the other bearing axis in alternate directions; and the other of the frame parts normally supported by a trunnion thereon removably engaging in an upwardly open socket receptacle at the said one bearing axis; latch means to normally latch the other of the frame parts to the main frame and latch means to normally latch the one frame part to the other frame part, to normally prevent hinging movements, and means operable by an operator to release the latch means selectively; weight counterbalancing means for the two frame parts when hingingly moving in unison comprising a spring connected between the other of the frame parts and the main frame; and weight counterbalancing means for the one frame part when hingingly moving by itself comprising a spring connected between the two frame parts.

JAMES F. MAINE.

REFERENCES CITED

The following references are of record in the file of this patent:

UNITED STATES PATENTS

| Number | Name | Date |
| --- | --- | --- |
| Re. 13,097 | Molder | Mar. 22, 1910 |
| 942,419 | Strettles | Dec. 7, 1909 |
| 1,017,039 | Delanoy | Feb. 13, 1912 |
| 1,780,470 | Dunham | Nov. 4, 1930 |
| 2,163,964 | Prehoda | June 27, 1939 |
| 2,196,835 | Maine | Apr. 9, 1940 |